US012030814B2

United States Patent
Zhang et al.

(10) Patent No.: US 12,030,814 B2
(45) Date of Patent: Jul. 9, 2024

(54) METHOD FOR PREPARING PORTLAND CEMENT FEATURING EARLY STRENGTH, LOW SHRINKAGE, AND LOW HEAT

(71) Applicants: China Building Materials Academy Co., Ltd., Beijing (CN); China National Building Material Group Co., Ltd., Beijing (CN)

(72) Inventors: Kunyue Zhang, Beijing (CN); Xiao Zhi, Beijing (CN); Min Wang, Beijing (CN); Zhaijun Wen, Beijing (CN); Xiaopeng An, Beijing (CN); Wen Huang, Beijing (CN); Guang Yao, Beijing (CN); Yang Yu, Beijing (CN); Xin Shen, Beijing (CN)

(73) Assignees: 1st Assignee: CHINA BUILDING MATERIALS ACADEMY CO., LTD., Beijing (CN); 2nd Assignee: CHINA NATIONAL BUILDING MATERIAL GROUP CO., LTD., Beijing (CN)

( * ) Notice: Subject to any disclaimer, the term of this patent is extended or adjusted under 35 U.S.C. 154(b) by 0 days.

(21) Appl. No.: 18/195,960

(22) Filed: May 11, 2023

(65) Prior Publication Data

US 2024/0067566 A1    Feb. 29, 2024

(30) Foreign Application Priority Data

Aug. 31, 2022   (CN) .......................... 202211053589.2

(51) Int. Cl.
| C04B 14/06 | (2006.01) |
| C04B 14/10 | (2006.01) |
| C04B 14/28 | (2006.01) |
| C04B 14/30 | (2006.01) |
| C04B 14/36 | (2006.01) |
| C04B 18/06 | (2006.01) |
| C04B 18/14 | (2006.01) |
| C04B 28/14 | (2006.01) |
| C04B 40/00 | (2006.01) |
| C04B 111/34 | (2006.01) |

(52) U.S. Cl.
CPC .............. C04B 28/14 (2013.01); C04B 14/06 (2013.01); C04B 14/106 (2013.01); C04B 14/285 (2013.01); C04B 14/304 (2013.01); C04B 14/36 (2013.01); C04B 18/065 (2013.01); C04B 18/144 (2013.01); C04B 40/0032 (2013.01); C04B 40/0046 (2013.01); C04B 40/0082 (2013.01); C04B 2111/34 (2013.01); C04B 2201/50 (2013.01)

(58) Field of Classification Search
CPC ..... C04B 14/06; C04B 14/106; C04B 14/285; C04B 14/36; C04B 18/144; C04B 40/0046
See application file for complete search history.

(56) References Cited

U.S. PATENT DOCUMENTS

| 2021/0094876 A1* | 4/2021 | Berodier | ............ C04B 40/0032 |
| 2021/0403336 A1* | 12/2021 | Kang | ........................ C09C 1/02 |

FOREIGN PATENT DOCUMENTS

| CN | 1785876 | A | 6/2006 | | |
| CN | 102849968 | A | 1/2013 | | |
| CN | 105330180 | A | 2/2016 | | |
| CN | 110204228 | A | 9/2019 | | |
| CN | 110615627 | A | 12/2019 | | |
| CN | 110950554 | A | 4/2020 | | |
| CN | 111925137 | A | 11/2020 | | |
| CN | 114835416 | A | * | 8/2022 | |
| CN | 115417609 | A | * | 12/2022 | |
| EP | 1900700 | A1 | * | 3/2008 | ............. C04B 7/147 |
| JP | 2000272939 | A | * | 10/2000 | ............. C04B 7/243 |
| JP | 2002308662 | A | | 10/2002 | |
| JP | 2004099425 | A | | 4/2004 | |
| JP | 2017122016 | A | | 7/2017 | |
| JP | 2020001954 | A | | 1/2020 | |
| KR | 20120075175 | A | * | 7/2021 | |

OTHER PUBLICATIONS

Machine translation of CN115417609, publication date Dec. 2, 2022.*

* cited by examiner

*Primary Examiner* — Jun Li
(74) *Attorney, Agent, or Firm* — MATTHIAS SCHOLL P.C.; Matthias Scholl

(57) ABSTRACT

A method for preparing Portland cement includes: respectively weighing iron slag, copper slag, vanadium slag, and nickel slag and grinding, to yield prefabricated iron slag, prefabricated copper slag, prefabricated vanadium slag, and prefabricated nickel slag; weighing mica and kaolinite, mixing, and grinding to obtain aluminous raw materials; evenly mixing the prefabricated iron slag and the aluminous raw materials, and calcining, to yield an iron-aluminum eutectic mineral; weighing the marble, fluorite, dolomite, and quartz, evenly mixing the marble, fluorite, dolomite, and quartz with the prefabricated copper slag, prefabricated vanadium slag, and prefabricated nickel slag to yield a first mixture; grinding the iron-aluminum eutectic mineral to yield powders, and calcining a second mixture of the first mixture and the powders, to yield the cement clinker; and cooling the cement clinker, and grinding a third mixture of the cooled cement clinker and the gypsum, to yield the Portland cement.

7 Claims, No Drawings

METHOD FOR PREPARING PORTLAND CEMENT FEATURING EARLY STRENGTH, LOW SHRINKAGE, AND LOW HEAT

CROSS-REFERENCE TO RELATED APPLICATIONS

Pursuant to 35 U.S.C. § 119 and the Paris Convention Treaty, this application claims foreign priority to Chinese Patent Application No. 202211053589.2 filed Aug. 31, 2022, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a method for preparing Portland cement featuring early strength, low shrinkage, and low heat.

Low heat Portland cement, with dicalcium silicate ($C_2S$) as a dominant mineral, has properties such as low heat, high post strength, low dry shrinkage, and high corrosion resistance. It is suitable for large volume concrete projects such as hydraulic and marine engineering, and has a significant effect on reducing the adiabatic temperature rise of concrete.

However, due to the lack of early strength, low heat Portland cement is difficult to meet the application requirements in railway engineering, especially in the complex harsh environment such as strong ultraviolet ray, large temperature difference, strong wind drying, high ground stress, high ground source heat, frequent freezing and thawing, etc.

Due to the slow hydration rate of dicalcium silicate in the early stage, the early strength of cement is low, so that the existing low heat Portland cement cannot meet the construction needs of railway engineering which requires early strength for formwork removal. Particularly, for the complex and harsh environment in plateau areas, the shrinkage cracking risk of concrete of railway engineering structures significantly increases, which needs to reduce the shrinkage rate of cement.

SUMMARY

To solve the aforesaid problems, the disclosure provides a method for preparing Portland cement featuring early strength, low shrinkage, and low heat, the Portland cement comprising 90-97 parts by weight of a cement clinker and 3-10 parts by weight of gypsum; the cement clinker being obtained by calcining cement raw materials comprising: 10-20 parts by weight of marble, 3-5 parts by weight of fluorite, 20-35 parts by weight of dolomite, 2-9 parts by weight of quartz, 8-12 parts by weight of mica, 2-3 parts by weight of kaolinite, 2-5 parts by weight of prefabricated iron slag, 3-4 parts by weight of prefabricated copper slag, 8-15 parts by weight of prefabricated vanadium slag, and 5-13 parts by weight of prefabricated nickel slag; and the method comprising:

1) respectively weighing iron slag, copper slag, vanadium slag, and nickel slag and grinding, to yield the prefabricated iron slag, the prefabricated copper slag, the prefabricated vanadium slag, and the prefabricated nickel slag;

2) weighing the mica and the kaolinite, mixing, and grinding to obtain aluminous raw materials;

3) evenly mixing the prefabricated iron slag and the aluminous raw materials, and calcining, to yield an iron-aluminum eutectic mineral;

4) weighing the marble, fluorite, dolomite, and quartz, evenly mixing the marble, fluorite, dolomite, and quartz with the prefabricated copper slag, prefabricated vanadium slag, and prefabricated nickel slag to yield a first mixture; grinding the iron-aluminum eutectic mineral to yield powders, and calcining a second mixture of the first mixture and the powders, to yield the cement clinker; and 5) cooling the cement clinker, and grinding a third mixture of the cooled cement clinker and the gypsum, to yield the Portland cement featuring early strength, low shrinkage, and low heat.

In a class of this embodiment, the Portland cement further comprises 5-10 parts by weight of coal ash.

In a class of this embodiment, the prefabricated iron slag and the prefabricated copper slag have a cumulative particle size distribution D50≤30 μm; the prefabricated vanadium slag and the prefabricated nickel slag have a cumulative particle size distribution D90≤30 μm; the mica and the kaolinite are ground to have a cumulative particle size distribution D50≤50 μm; and other components are ground to have a cumulative particle size distribution D50≤60 μm.

In a class of this embodiment, the cement clinker has a liter weight greater than 1450 g/L.

In a class of this embodiment, the cement clinker comprises 30-40 wt. % of $C_3S$, 40-50 wt. % of $C_2S$, 1-6 wt. % of $C_3A$, and 15-20 wt. % of $C_4AF$.

In a class of this embodiment, a 3-day hydration heat of cement is 180-230 kj/kg, 7-day hydration heat is 220-250 kj/kg, 3-day compressive strength is 17-20 MPa, 7-day compressive strength is 20-30 MPa, 28-day compressive strength is 45-60 MPa, and 28-day dry shrinkage is 0.04-0.06%.

In a class of this embodiment, in 3), the prefabricated iron slag and the aluminous raw materials are mixed evenly, calcined in a furnace at 1100-1200° ° C. for 1.5-2 hours, taken out of the furnace, and cooled to room temperature at a rate of 50-100° C./min, to yield the iron-aluminum eutectic mineral; in 4), the marble, the fluorite, the dolomite, the quartz, the prefabricated copper slag, the prefabricated vanadium slag, and the prefabricated nickel slag are evenly mixed to yield the first mixture; the iron-aluminum eutectic mineral is ground into the powders, and the second mixture of the first mixture and the powders is preheated to a temperature of 700-800° C. in a preheater, and the temperature is held for 0.5-1 hour; the second mixture is calcined in a kiln at 1250-1350° C. for 1-2 hours, taken out of the kiln, first cooled to 800-1000° C. at a rate of 100-200° C./min, then to 300-500° C. at a rate of 30-50° C./min, and finally to room temperature.

The method improves the early strength, reduces shrinkage rate, thus suppressing the technical problems of shrinkage, deformation, and cracking risks of concrete.

The following advantages are associated with the method for preparing Portland cement featuring early strength, low shrinkage, and low heat of the disclosure:

1. The composition of the material is optimized. Introducing vanadium slag increases the hydration activity and enhances the later strength of the cement; introducing the nickel slag reduces the dry shrinkage of cement and improves its durability; introducing iron and copper slag increases the early strength of the cement.
2. The slags of different components are ground by gradient grading and prefabricated into different grades and sizes. The fine particles of the prefabricated iron slag, prefabricated copper slag, prefabricated vanadium slag and prefabricated nickel slag with potential activity are inlaid between the large particles of other components. In the subsequent calcination process, due to the increase of chemical energy, the physical and chemical reactions are sufficient, the obtained mineral components are more stable and highly active, and the clinker is denser and has better performance.
3. The clinker of the early strength, low shrinkage and low heat Portland cement is calcined in two steps. The first step is that the mixture of mica and kaolinite is calcined together with the prefabricated iron slag to ensure that a sufficient amount of highly active iron aluminum eutectic minerals is generated; the second step is to mix marble, fluorite, dolomite, quartz, prefabricated copper slag, prefabricated vanadium slag, and prefabricated nickel slag, and then calcine them together with the highly active iron aluminum eutectic minerals generated in the first step to obtain a clinker with high stable and active crystal forms of silicate minerals and solvent minerals.

The 3-day hydration heat of the prepared cement is 180-230 kj/kg, 7-day hydration heat is 220-250 kj/kg, 3-day compressive strength is 17-20 MPa, 7-day compressive strength is 20-30 MPa, 28-day compressive strength is 45-60 MPa, and 28-day dry shrinkage is 0.04-0.06%.

DETAILED DESCRIPTION

To further illustrate the disclosure, embodiments detailing a method for preparing Portland cement featuring early strength, low shrinkage, and low heat are described below. It should be noted that the following embodiments are intended to describe and not to limit the disclosure.

The disclosure provides Portland cement featuring early strength, low shrinkage, and low heat. The Portland cement comprises 90-97 parts by weight of a cement clinker and 3-10 parts by weight of gypsum; the cement clinker being obtained by calcining cement raw materials comprising: 10-20 parts by weight of marble, 3-5 parts by weight of fluorite, 20-35 parts by weight of dolomite, 2-9 parts by weight of quartz, 8-12 parts by weight of mica, 2-3 parts by weight of kaolinite, 2-5 parts by weight of prefabricated iron slag, 3-4 parts by weight of prefabricated copper slag, 8-15 parts by weight of prefabricated vanadium slag, and 5-13 parts by weight of prefabricated nickel slag.

Vanadium slag: vanadium ions in vanadium titanium ore is conducive to stabilizing the $C_2S$ crystal form of B ore in low heat Portland cement into β or α' type high activity crystal form, can also increase the [MOx] (metal oxide) coordination number, increase the M-O bond length, reduce the ionic binding force and bond energy, and increase the hydration activity. By stabilizing the highly active crystal form, the $C_2S$ hydration rate is increased and the later strength of the cement is effectively improved.

Nickel slag: Nickel has good corrosion resistance. The addition of nickel can improve the corrosion resistance of cement against chloride and sulfate ions, effectively reducing the dry shrinkage of cement, and improve the durability of concrete.

Iron slag: Iron slag and aluminous materials such as mica and kaolinite can be ground together and calcined to form highly active iron aluminum eutectic minerals, which can significantly increase the early strength of low heat Portland cement.

Copper slag: Copper ions can improve the cementitious properties of $C_3S$ in clinker, increase its hydration reaction degree, and increase the early strength of cement.

Further, the Portland cement further comprises 5-10 parts by weight of coal ash.

Further, the prefabricated iron slag and the prefabricated copper slag have a cumulative particle size distribution D50≤30 μm; the prefabricated vanadium slag and the prefabricated nickel slag have a cumulative particle size distribution D90≤30 μm; the mica and the kaolinite are ground to have a cumulative particle size distribution D50≤50 μm; and other components are ground to have a cumulative particle size distribution D50≤60 11m.

Before the calcination of cement, the prefabricated iron slag, prefabricated copper slag, prefabricated vanadium slag, and prefabricated nickel slag are all separately ground from corresponding raw materials, among which the prefabricated iron slag and prefabricated copper slag are ground to D50≤30 μm, the prefabricated vanadium slag and the prefabricated nickel slag are ground to D90≤3011m, and other components are ground to D50≤50 μm. When the prefabricated iron slag, prefabricated copper slag, prefabricated vanadium slag and prefabricated nickel slag are mixed with other components, the fine particles with potential activity of the prefabricated iron slag, prefabricated copper slag, prefabricated vanadium slag and prefabricated nickel slag will be embedded between the large particles of other components. In the subsequent calcination process, due to the increase of chemical energy and more sufficient physicochemical reaction, the obtained mineral components are more stable and have higher activity, and clinker is denser with better performance.

Further, the cement clinker has a liter weight greater than 1450 g/L.

Further, the cement clinker comprises 30-40 wt. % of $C_3S$, 40-50 wt. % of $C_2S$, 1-6 wt. % of $C_3A$, and 15-20 wt. % of $C_4AF$.

The 3-day hydration heat of cement is 180-230 kj/kg, 7-day hydration heat is 220-250 kj/kg, 3-day compressive strength is 17-20 MPa, 7-day compressive strength is 20-30 MPa, 28-day compressive strength is 45-60 MPa, and 28-day dry shrinkage is 0.04-0.06%.

The method for preparing Portland cement featuring early strength, low shrinkage, and low heat comprises:
1) respectively weighing iron slag, copper slag, vanadium slag, and nickel slag and grinding, to yield the prefabricated iron slag, the prefabricated copper slag, the prefabricated vanadium slag, and the prefabricated nickel slag;
2) weighing the mica and the kaolinite, mixing, and grinding to obtain aluminous raw materials;
3) evenly mixing the prefabricated iron slag and the aluminous raw materials, and calcining, to yield an iron-aluminum eutectic mineral;
4) weighing the marble, fluorite, dolomite, and quartz, evenly mixing the marble, fluorite, dolomite, and quartz with the prefabricated copper slag, prefabricated vanadium slag, and prefabricated nickel slag to yield a first mixture; grinding the iron-aluminum eutectic mineral to yield powders, and calcining a second mixture of the first mixture and the powders, to yield the cement clinker; and 5) cooling the cement clinker, and grinding a third mixture of the cooled cement clinker and the gypsum, to yield the Portland cement featuring early strength, low shrinkage, and low heat.

Specifically, in 3), the prefabricated iron slag and the aluminous raw materials are mixed evenly, calcined in a furnace at 1100-1200° C. for 1.5-2 hours, taken out of the furnace, and cooled to room temperature at a rate of 50-100° C./min, to yield the iron-aluminum eutectic mineral;

in 4), the marble, the fluorite, the dolomite, the quartz, the prefabricated copper slag, the prefabricated vanadium slag, and the prefabricated nickel slag are evenly mixed to yield the first mixture; the iron-aluminum eutectic mineral is ground into the powders, and the second mixture of the first mixture and the powders is preheated to a temperature of 700-800° C. in a preheater, and the temperature is held for 0.5-1 hour; the second mixture is calcined in a kiln at 1250-1350° ° C. for 1-2 hours, taken out of the kiln, first cooled to 800-1000° C. at a rate of 100-200° C./min, then to 300-500° C. at a rate of 30-50° C./min, and finally to room temperature.

The clinker of the early strength, low shrinkage and low heat Portland cement is calcined in two steps. The first step is that the mixture of mica and kaolinite is calcined together with the prefabricated iron slag to ensure that a sufficient amount of highly active iron aluminum eutectic minerals is generated; the second step is to mix marble, fluorite, dolomite, quartz, prefabricated copper slag, prefabricated vanadium slag, and prefabricated nickel slag, and then calcine them together with the highly active iron aluminum eutectic minerals generated in the first step to obtain a clinker with high stable and active crystal forms of silicate minerals and solvent minerals.

Example 1

Portland cement featuring early strength, low shrinkage, and low heat is provided. The Portland cement comprises 90 parts by weight of a cement clinker and 10 parts by weight of gypsum; the cement clinker is obtained by calcining cement raw materials comprising: 10 parts by weight of marble, 3 parts by weight of fluorite, 35 parts by weight of dolomite, 9 parts by weight of quartz, 8 parts by weight of mica, 2 parts by weight of kaolinite, 8 parts by weight of montmorillonite, 2 parts by weight of iron slag, 4 parts by weight of copper slag, 15 parts by weight of vanadium slag, and 5 parts by weight of nickel slag.

Example 2

Portland cement featuring early strength, low shrinkage, and low heat is provided. The Portland cement comprises 97 parts by weight of a cement clinker and 3 parts by weight of gypsum; the cement clinker is obtained by calcining cement raw materials comprising: 20 parts by weight of marble, 3 parts by weight of fluorite, 20 parts by weight of dolomite, 2 parts by weight of quartz, 12 parts by weight of mica, 3 parts by weight of kaolinite, 5 parts by weight of montmorillonite, 5 parts by weight of iron slag, 3 parts by weight of copper slag, 8 parts by weight of vanadium slag, and 13 parts by weight of nickel slag.

Example 3

Portland cement featuring early strength, low shrinkage, and low heat is provided. The Portland cement comprises 90 parts by weight of a cement clinker, 3 parts by weight of gypsum, 5 parts by weight of fly ash, and 2 parts by weight of mineral powder; the cement clinker is obtained by calcining cement raw materials comprising: 20 parts by weight of marble, 3 parts by weight of fluorite, 35 parts by weight of dolomite, 9 parts by weight of quartz, 10 parts by weight of mica, 2 parts by weight of kaolinite, 6 parts by weight of montmorillonite, 5 parts by weight of iron slag, 3 parts by weight of copper slag, 10 parts by weight of vanadium slag, and 10 parts by weight of nickel slag.

Performance testing was conducted on the Portland cement featuring early strength, low shrinkage, and low heat and clinker of Examples 1-3 using conventional testing methods. The results are shown in Table 1.

TABLE 1

| | Mineral content of clinker % | | | | Vertical lifting weight of clinker | Compressive strength MPa | | | Hydration heat kJ/kg | | 28 d Dry shrinkage |
|---|---|---|---|---|---|---|---|---|---|---|---|
| | $C_3S$ | $C_2S$ | $C_3A$ | $C_4AF$ | g/L | 3 d | 7 d | 28 d | 3 d | 7 d | rate % |
| Example 1 | 38.1 | 42.5 | 2.5 | 15.1 | 1465 | 17.2 | 22.7 | 47.7 | 189 | 228 | 0.048 |
| Example 2 | 34.2 | 45.3 | 3.3 | 16.3 | 1455 | 17.7 | 23.8 | 50.8 | 208 | 230 | 0.055 |
| Example 3 | 30.5 | 48.2 | 4.1 | 16.1 | 1460 | 18.6 | 25.4 | 56.8 | 215 | 239 | 0.040 |
| Comparison Example (Ordinary low heat Portland cement) | 40.5 | 41.1 | 3.2 | 14.5 | 1430 | 14 | 20.7 | 48.5 | 210 | 245 | 0.075 |

Through experimental data, it can be seen that compared with ordinary low heat Portland cement, the early strength and low shrinkage low heat Portland cement of the present invention has a compressive strength of 20-40% higher in 3d, a compressive strength of 10-20% higher in 7d, and a dry shrinkage rate of 20-30% lower in 28d. Achieved the expected objectives of the present invention.

It will be obvious to those skilled in the art that changes and modifications may be made, and therefore, the aim in the appended claims is to cover all such changes and modifications.

What is claimed is:

1. A method for preparing Portland cement, the Portland cement comprising 90-97 parts by weight of a cement clinker and 3-10 parts by weight of gypsum; the cement clinker being obtained by calcining cement raw materials comprising: 10-20 parts by weight of marble, 3-5 parts by weight of fluorite, 20-35 parts by weight of dolomite, 2-9 parts by weight of quartz, 8-12 parts by weight of mica, 2-3 parts by weight of kaolinite, 2-5 parts by weight of prefabricated iron slag, 3-4 parts by weight of prefabricated copper slag, 8-15 parts by weight of prefabricated vanadium slag, and 5-13 parts by weight of prefabricated nickel slag; and the method comprising:

1) respectively weighing iron slag, copper slag, vanadium slag, and nickel slag and grinding, to yield the prefabricated iron slag, the prefabricated copper slag, the prefabricated vanadium slag, and the prefabricated nickel slag;
2) weighing the mica and the kaolinite, mixing, and grinding to obtain aluminous raw materials;
3) evenly mixing the prefabricated iron slag and the aluminous raw materials, and calcining, to yield an iron-aluminum eutectic mineral;
4) weighing the marble, fluorite, dolomite, and quartz, evenly mixing the marble, fluorite, dolomite, and quartz with the prefabricated copper slag, prefabricated vanadium slag, and prefabricated nickel slag to yield a first mixture; grinding the iron-aluminum eutectic mineral to yield powders, and calcining a second mixture of the first mixture and the powders, to yield the cement clinker; and
5) cooling the cement clinker, and grinding a third mixture of the cooled cement clinker and the gypsum, to yield the Portland cement.

2. The method of claim 1, wherein the Portland cement further comprises 5-10 parts by weight of coal ash.

3. The method of claim 1, wherein the prefabricated iron slag and the prefabricated copper slag have a cumulative particle size distribution D50≤30 μm; the prefabricated vanadium slag and the prefabricated nickel slag have a cumulative particle size distribution D90≤30 μm; the mica and the kaolinite are ground to have a cumulative particle size distribution D50≤50 μm; and other components are ground to have a cumulative particle size distribution D50≤60 μm.

4. The method of claim 1, wherein the cement clinker has a liter weight greater than 1450 g/L.

5. The method of claim 1, wherein the cement clinker comprises 30-40 wt. % of $C_3S$, 40-50 wt. % of $C_2S$, 1-6 wt. % of $C_3A$, and 15-20 wt. % of $C_4AF$.

6. The method of claim 1, wherein a 3-day hydration heat of cement is 180-230 kj/kg, 7-day hydration heat is 220-250 kj/kg, 3-day compressive strength is 17-20 MPa, 7-day compressive strength is 20-30 MPa, 28-day compressive strength is 45-60 MPa, and 28-day dry shrinkage is 0.04-0.06%.

7. The method of claim 1, wherein in 3), the prefabricated iron slag and the aluminous raw materials are mixed evenly, calcined in a furnace at 1100-1200° C. for 1.5-2 hours, taken out of the furnace, and cooled to room temperature at a rate of 50-100° C./min, to yield the iron-aluminum eutectic mineral; in 4), the marble, the fluorite, the dolomite, the quartz, the prefabricated copper slag, the prefabricated vanadium slag, and the prefabricated nickel slag are evenly mixed to yield the first mixture; the iron-aluminum eutectic mineral is ground into the powders, and the second mixture of the first mixture and the powders is preheated to a temperature of 700-800° C. in a preheater, and the temperature is held for 0.5-1 hour; the second mixture is calcined in a kiln at 1250-1350° C. for 1-2 hours, taken out of the kiln, first cooled to 800-1000° C. at a rate of 100-200° C./min, then to 300-500° C. at a rate of 30-50° C./min, and finally to room temperature.

* * * * *